Oct. 7, 1941.    J. A. PETERSON    2,257,854
PRESSURE REGULATOR FOR FLUIDS
Filed July 12, 1938    3 Sheets-Sheet 1

Inventor
J. A. Peterson
By Arthur H. Sturges
Attorney

Oct. 7, 1941. J. A. PETERSON 2,257,854
PRESSURE REGULATOR FOR FLUIDS
Filed July 12, 1938 3 Sheets-Sheet 2

Inventor
J.A.Peterson
By Arthur H. Sturges
Attorney

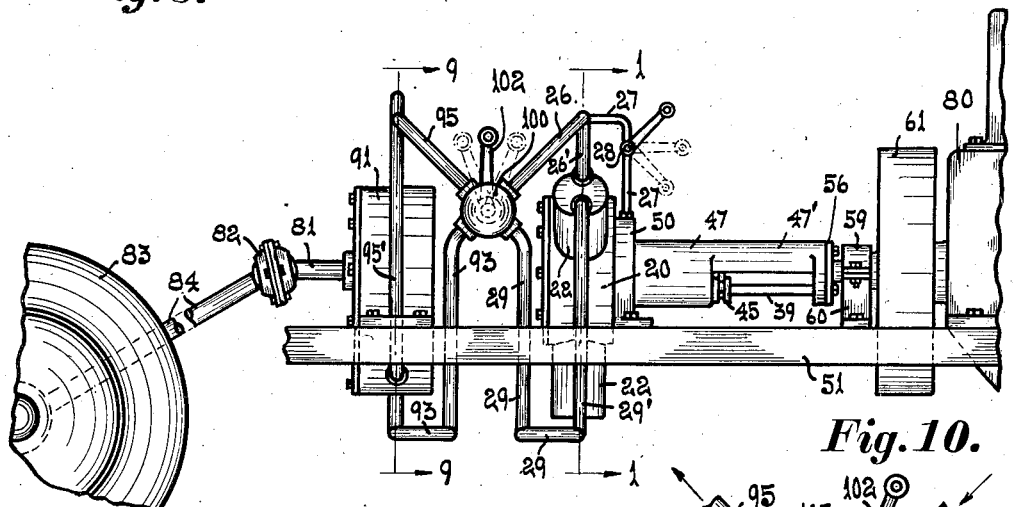
Fig. 8.
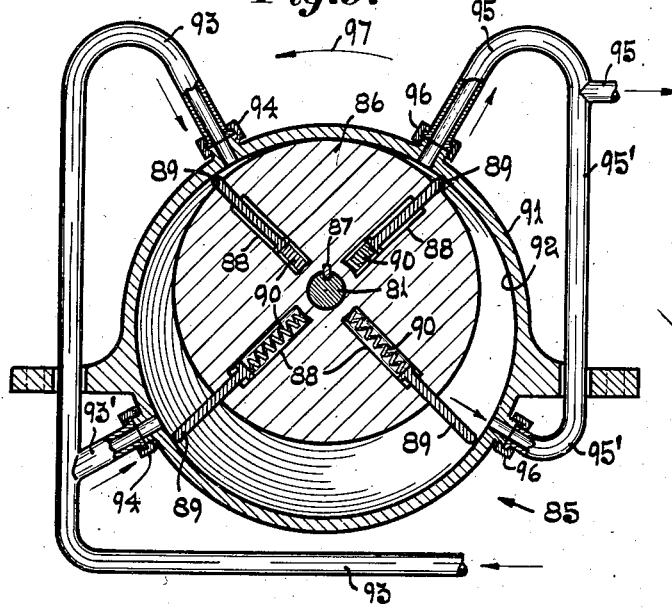
Fig. 9.
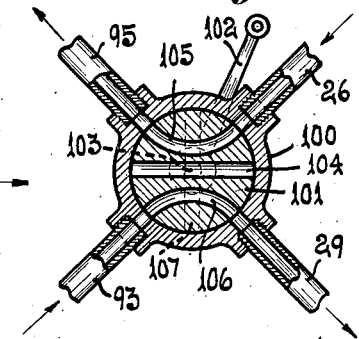
Fig. 10.
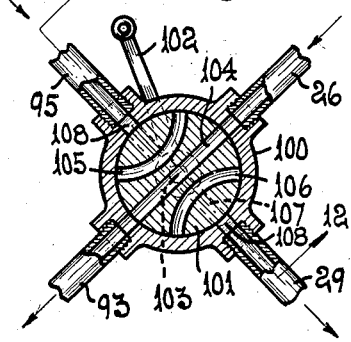
Fig. 11.
Fig. 12.
Inventor
J. A. Peterson
By Arthur H. Sturges
Attorney Patented Oct. 7, 1941

2,257,854

UNITED STATES PATENT OFFICE 2,257,854

PRESSURE REGULATOR FOR FLUIDS

Joseph A. Peterson, Chicago, Ill.

Application July 12, 1938, Serial No. 218,872

5 Claims. (Cl. 103—38)

This invention relates to pumps usable for any utilitarian purpose including a propulsion of motor vehicle.

It is an object of the invention to provide a pump mechanism and means for varying the length of the stroke of the pistons thereof whereby a selected degree of fluid under pressure may be generated without regard to the speed with which the pistons are reciprocated by a driver or engine for the purpose, among others, of propelling a motor vehicle, fast or slow, as may be desired.

Another object of the invention is to provide means for propelling a motor vehicle, or the like, by the power of the engine thereof and without the use of power transmission pinions, clutches and the like, whereby a comparatively light weight vehicle is provided of comparatively few and simple parts and selective variable speeds are attainable therewith.

A further object of the invention is to provide fluid transmission whereby power from an internal combustion engine or other source may be transmitted to the wheels of said vehicle for the purpose of driving the latter either forwardly or reversely.

A still further object of the invention is to provide an improved fluid motor mounted on the propeller shaft for the rear wheels of the vehicle in which no loss of power will be sustained and in which simplicity of construction and faithfulness of operation will prevail.

Another object of the invention resides in providing an improved transmission mechanism involving an improved control valve structure and pipe line system for governing the flow of the fluid under pressure to the motor or motors.

A still further object of the invention resides in providing an improved fluid transmission system for vehicles in which the heretofore troublesome and expensive gear shift mechanism is dispensed with and whereby a more continuous drive is had with consequently improved riding qualities in the vehicle and in which the control of the system by the vehicle operator is simple and easy.

With the foregoing and other objects in view the invention will be more fully described hereinafter and will be more particularly pointed out in the claims appended hereto.

In the drawings wherein like symbols refer to like or corresponding parts throughout the several views:

Figure 8 is a fragmentary side view of vehicle chassis and illustrating applied thereto the improved transmission system as constructed in accordance with an embodiment of the present invention.

Figure 9 is a cross section of a motor employed taken on line 9—9 of Figure 8.

Figure 10 is a transverse sectional view of a switching valve employed.

Figure 11 is a transverse sectional view of the switching valve showing the valve in a different position from that shown in Figure 10.

Figure 12 is a longitudinal section of said switch valve taken substantially on line 12—12 of Figure 11.

Figure 1:
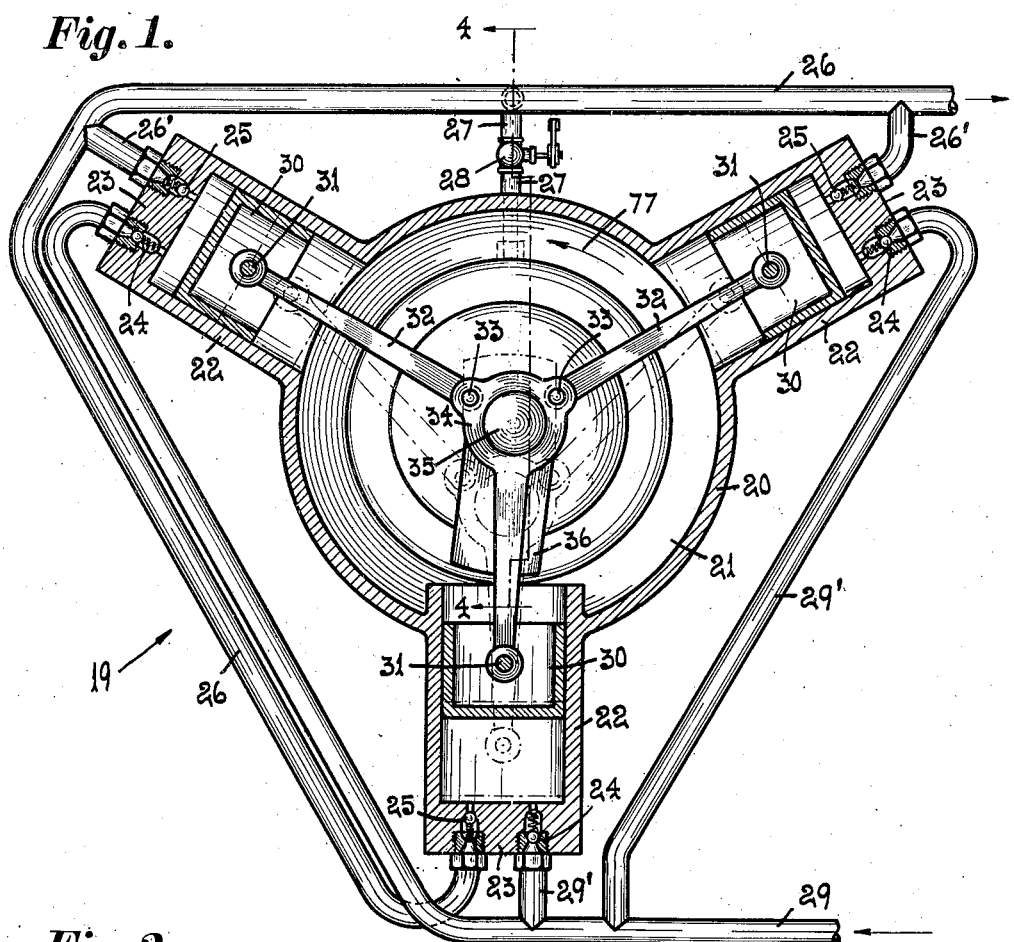
Figure 1 is a vertical section of a multiple cylinder pump, the view being taken substantially on line 1—1 of Figure 8.

Referring more particularly to the drawings 19 indicates generally a pump having an annular housing 20 which is provided with a medially disposed chamber 21. Any suitable number of cylinders 22 are radially disposed with respect to the housing 20, said cylinders being angularly equi-distantly spaced apart; only three such cylinders being shown in Figure 1, for convenience of illustration. The head 23 of each cylinder 22 is provided with an inlet and outlet port which are normally sealed by any suitable releasable means, such as the inlet ball check valve 24 and the outlet ball check valve 25, it being understood that if desired slide valves or any other conventional valves may be employed for said purpose if desired. The outlet valves 25 of each cylinder head are in communication with a line pipe or conduit 26, said outlet pipe 26 being provided with branches 26' whereby said pipe is common to all of the outlets of the cylinders.

The outlet pipe 26 is provided with a branch 27, the latter having a cut off cock 28 for by-passing oil or any suitable fluid pumped, as later described, to and from the interior of the crank case or chamber 21 of the housing 20 for purposes later described.

An intake conduit 29 which is in communication with a suitable source of supply of oil or other fluid or, as later described, which is in communication with the device depicted in Figure 9 is provided with branches 29' whereby the pipe 29 is in communication with the inlet ports and inlet check valves 24 of each cylinder whereby the oil is pumped from the pipe 29 outwardly through the pipe 26 for doing useful work as later described, said oil being pumped in a circuit for propelling an automobile through the employment of later described media.

At times when the herein described pump is employed for pumping water or the like the pipe 29 is in communication with a supply of said water and the outlet pipe or discharge pipe 26 may be attached to a hose or other suitable delivery and conveyance means for pumped water.

When used for pumping air the intake pipe 29 is open to the atmosphere and the outlet pipe 26 is disposed in communication with a tank not shown for storing compressed air therein.

Within each cylinder 22 a reciprocable piston 30 is provided, said pistons being secured by wrist pins 31 to the outer end of their respective connecting rods 32, the inwardly disposed ends of said rods, with the exception of one thereof, being pivotally connected as at 33 to a collar 34. The collar encircles a crank throw pin 35 of a later described crank shaft and may be formed integral with the inner end of one of the connecting rods 32 as shown in Figure 1.

Figure 2:
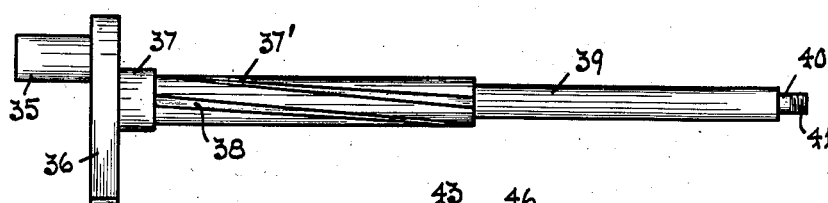
Figure 2 is a side view of a crank shaft employed.
Figure 4:
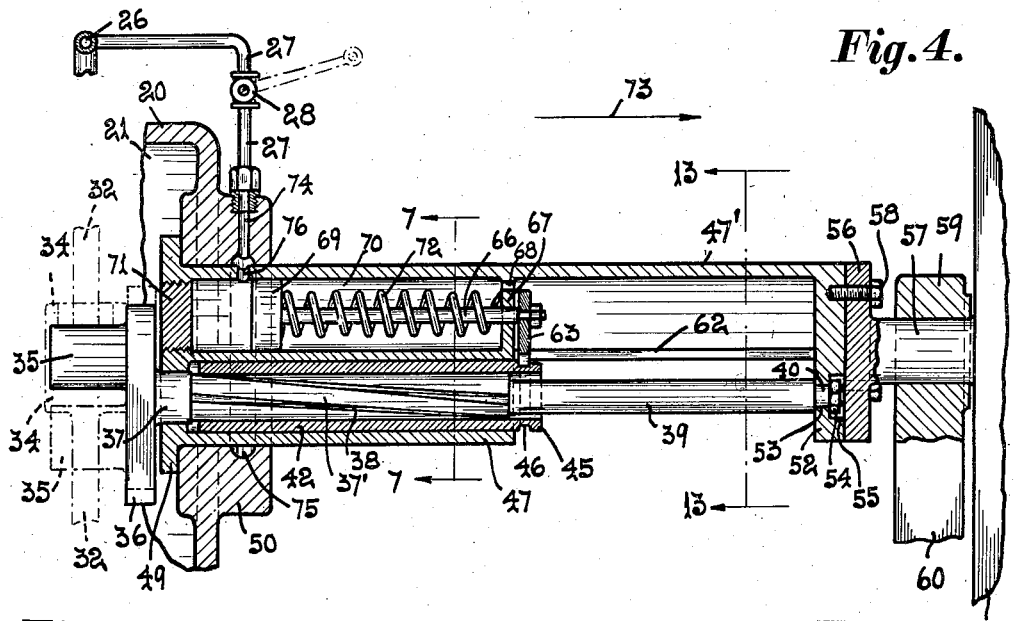
Figure 4 is a transverse section of a fragment of the pump, crank shaft, sleeve and certain adjunct parts assembled, the view being taken substantially on line 4—4 of Figure 1.

The crank throw pin 35 may be formed integral with an arm 36, the latter being shown as formed integral with the crank shaft 37. The crank shaft 37 and said throw 35 extend outwardly from opposite sides of the arm 36, as best shown in Figure 4. The crank shaft 37 is provided with a splined or fluted portion 37', said splines or ribs being helically disposed longitudinally of the shaft whereby between said splines helically disposed grooves 38 are provided for the shaft 37, as best shown in Figure 2.

The ends of each of the grooves 38 are disposed 90 degrees apart with respect to each other or one-fourth of the circumference of the portion of the crank shaft which is provided with said grooves whereby, as later described, a movement may be imparted to the crank throw pin 35 through an arc of 180 degrees for purposes later described. It will be understood that if a lesser or greater movement be desired for the crank throw pin 35 for certain types of work that the opposite ends of each groove 38 may be disposed with respect to each other more or less than said 90 degrees accordingly. The crank shaft 37 further includes an elongated portion 39 which is of plain construction and of lesser diameter than the main body portion of the crank shaft 37 or the splines 37' thereof. The outer free end 40 of the crank shaft 37 is of lesser diameter than the portion 39 and is provided with screw threads 41.

Figure 3:
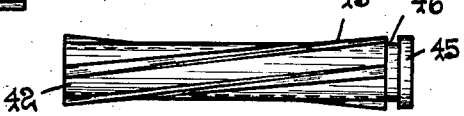
Figure 3 is a side view of a splined sleeve for the shaft shown in Figure 2.
Figure 7:
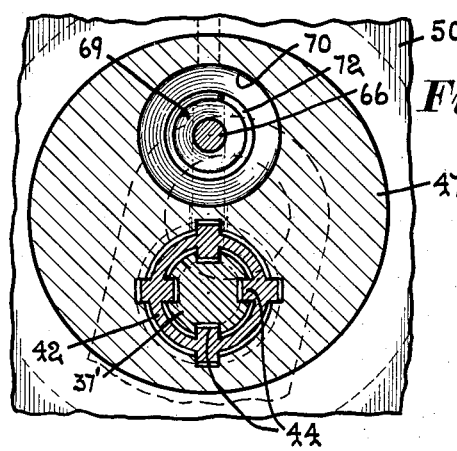
Figure 7 is a transverse sectional view taken on line 7—7 of Figure 4.

The sleeve 42 shown in Figure 3 is assembled upon the splined portion 37' of the shaft 37 as shown in Figure 7. A plurality of splines or lugs 43 are helically disposed upon the outer annular wall of the sleeve 42. The ends of each helical lug in the present illustration are disposed 90 degrees apart with respect to each other or substantially one-fourth of the circumference of the sleeve. The splined portions of the sleeve 42 and shaft 37 are of substantially the same length.

As shown in Figure 7, the inner annular wall of the sleeve 42 is also provided with inwardly projecting helically disposed lugs 44 which are complemental to and are received in the grooves 38 of the shaft portion 37', the lugs 44 being slidable in said grooves. The lugs 43 provided on the outer surface of the sleeve 42 are helically disposed in an opposite direction with respect to the inner lugs 44 of said sleeve. The sleeve 42 is provided at one end thereof with a boss 45 and between said boss and sleeve an annular groove 46 is provided for the reception therein of a later described fork. The sleeve 42 is slidable inwardly and outwardly of a supporting housing 47. As best shown in Figure 4, the supporting housing 47 is cut away as shown in Figure 4 for providing the housing with an open side for permitting an assembling of the parts. The supporting housing 47 is provided at the end thereof which is adjacent to the arm 36 of the crank throw with an annular flange 49. The supporting housing 47 is journalled through an end wall of the annular housing 20, as best shown in Figure 4, said supporting housing being circular in cross section as best shown in Figure 7. The flange 49 abuts against the inner surface of a boss 50 provided on said end wall of the housing 20 and prevents a movement longitudinally of the supporting housing 47 in one direction.

The supporting housing 47 at that end thereof which is remote to the annular flange 49 is provided with a sleeve portion 47' and an arm 52 is provided on the outer end of the sleeve 47'.

The threaded end 40 of the crank shaft is journalled through said arm as at 53. A nut 54 is provided upon the threads 41 of the crank shaft, said nut being received in a recess 55 provided in said arm for the purpose of disposing the nut within the plane of the arm and below the outer surface thereof whereby the flanged end 56 of a stub axle 57 may be secured flush to the arm 52 by means of suitable bolts or keepers 58.

The stub axle 57 is journalled through a bearing support 59 of a standard 60 and the latter may be cast integral with the main body portion of the annular housing 20 and preferably, as best shown in Figure 8, the support 60 for motor vehicle purposes is bolted to the frame 61 of the vehicle as shown in Figure 8. The stub axle 57 is secured to the fly wheel 61 of the engine of said vehicle.

Figure 6:
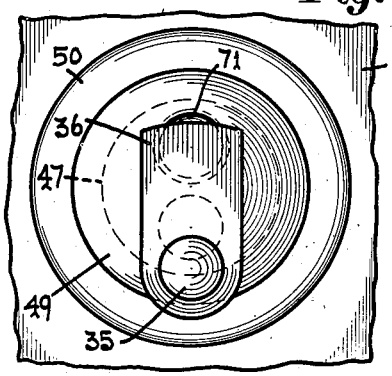
Figure 6 is a view similar to Figure 5 and showing the throw of the crank swung to a different position with respect to the showing thereof in Figure 5.

As shown in Figure 4 the stub axle pin 35 of the crank shaft is in alignment with the stub axle 57, said alignment being at the time when the crank shaft is in a neutral or normal position and it will be understood that the crank throw pin 35 is shiftable from said aligned neutral position to the position thereof shown in Figure 6 whereby the crank throw pin describes an arc of 180 degrees while being shifted as later explained.

Figure 13:
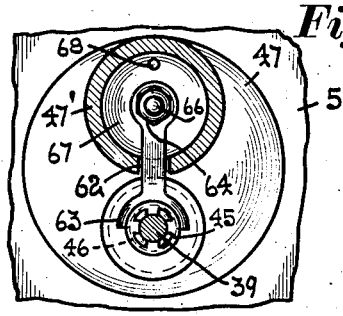
Figure 13 is a transverse section taken on line 13—13 of Figure 4.

Referring to Figure 13, the sleeve portion 47' of the supporting housing 47 is provided with an elongated slot 62. A slidable shifting fork or connector 63 extends through the slot 62 and the oppositely disposed walls of said slot prevent rotary movement of the fork 63, the latter being guided during longitudinal sliding movements thereof by said walls. The bifurcated lower end of the shifting fork 63 is engaged at all times within the annular groove 46 of the splined sleeve 42. The fork 63 is secured by means of a nut 64 to a piston rod 66, the latter being journalled through the end wall 67 of a cylinder portion of the supporting housing 47 and an air release vent aperture 68 is disposed through said end wall 67 of said cylinder.

The piston rod 66 is provided with a piston head 69 slidable within the cylinder portion 70 of the rotatable supporting housing 47 of the crank shaft 37. The cylinder is formed by providing a bore which extends through the annular flange 49, said bore being provided with a plug 71 threadedly engaged therein. The plug provides a head and closed end for the cylinder and at times when said plug is removed the piston head 69 and the rod 66 therefor may be inserted in said bore. Between the piston head 69 and the wall 67 a spring 72 is coiled about the piston rod 66 for urging the head away from the wall 67 and towards the plughead 71 of the cylinder. As thus described it will be noted that at times when the piston head is moved in the direction of the arrow 73 and against the urge of the spring 72 that a corresponding movement is imparted to the sleeve 42.

At times when the cut off cock 28 shown in Figures 1 and 4 is opened fluid or oil under pressure from the pipe 26 passes through the cut off cock 28 through the pipe 27, the latter being in communication, as shown in Figure 4, with a conduit-bore 74 formed through the boss 50 of the end wall of the annular housing 20.

The inner end of the conduit bore 74 is in communication with an annular groove 75 provided on the bore of the bushing or boss 50, said annular groove 75 being in alignment at all times with an aperture 76 disposed through the wall of the cylinder portion 70 of the supporting housing. Fluid under pressure is thereby admitted to said housing for urging the piston head 69 in the direction of said arrow. Preferably a plurality of the apertures 76 are provided so that the fluid under pressure is freely admitted to the interior of said cylinder.

Figures 8 to 12, inclusive, illustrate means applied to a motor vehicle for propelling the vehicle. From Figure 8 it will be understood that the frame 51 of the vehicle supports an internal combustion or other suitable engine 80 for driving the compressor pump 19 shown in Figure 1 and the heretofore described regulator therefor particularly shown in Figure 4. The vehicle is provided with a propeller shaft 81 and with a conventional universal joint 82 for propelling the wheels 83 of the vehicle through a jack shaft 84 in a well known manner.

The means which are provided for rotating the propeller shaft 81 by the pump mechanism 19 and adjunct parts thereof heretofore described may be any one of several different modifications. The one specifically illustrated in Figure 9 being depicted for convenience of illustration and comprises a motor generally indicated at 85 in Figure 9, said motor includes a disc 86 which is circular in plan through which the propeller shaft 81 extends. The disc 86 is splined or otherwise suitably secured as at 87 to the propeller shaft. The disc is provided with a plurality of equi-distant angularly spaced apart elongated recesses 88, the latter each having a tongue 89 slidably disposed therein.

The tongues 89 are at all times urged outwardly of the recesses 88 by means of springs 90. Eccentrics or the like may be employed for urging the tongues outwardly. The tongues, springs and the disc 86 are concentrically mounted on the propeller shaft 81 and the tongues, springs, disc and shaft 81 are eccentrically disposed with respect to a housing 91. The housing 91 is provided with an inner annular wall 92 against which the outer ends of the tongues 89 abut at all times by means of the urge of the springs 90 during revoluble movements of the disc 86. The housing 91 is rigidly secured to the frame 51 of the vehicle as shown in Figure 8. As may be seen from an inspection of Figure 9 a portion of the perimeter of the disc 86 is in contact at all times with the inner annular wall 92 of the housing 91.

The motor 85 is provided with intake pipes 93 and 93' for fluid under pressure. The outlet ends of the pipes 93 and 93' are in communication with the interior of the housing 91, being connected with the latter by any suitable means such as the nipples 94. The motor 85 is also provided with an outlet pipe 95 having a branch pipe 95', said pipes being connected to the housing 91 by nipples 96. The pipes 95 and 95' are also in communication with the interior of the motor housing.

Assuming that the outlet pipe 95 of the motor 85 is provided with a direct connection to the intake pipe 29 of the pump 19 and that the intake pipe 93 of the motor 85 is in direct communication with the outlet pipe 26 of said pump, it will be understood that fluid under pressure from the pump is conducted to the interior of the motor 85. Fluid under pressure is thus applied to the tongues 89 for causing the latter and the disc 86 to rotate in the direction of the arrow 97 shown in Figure 9. The propeller shaft 81 is thereby rotated to rotate the wheels 83 in a direction for causing the vehicle to move backwardly.

As the tongues 89, revolving in the direction of the arrow 97, pass the medial vertical line of the housing 91, they retire into their respective slots. The fluid or oil in front of said tongues is forced outwardly of the pipes 95 and 95' and returns to the pump 19 through the pipe 29, whereby a circulation of oil during operation of the engine 80 is provided for driving the vehicle in the said backward direction. It will be noted that if desired more than two of the intake and outlet pipes may be provided for the motor 85 and a larger number of the tongues 89 may be provided. Also it will be understood that a motor 85 may be applied to each individual rear wheel of the vehicle in lieu of one motor mounted on the crank shaft 81 and further that if desired all wheels of the vehicle, including the front steering wheels, may be provided with a motor 85 so that all the wheels may be drivers. This is of particular advantage on trucks having six or more wheels all of which may thus be converted into driving wheels.

In Figures 10, 11, and 12, means are provided for selectively effecting the rotation of the disc 85 in either the direction indicated by the arrow 97, or in the opposite direction.

Referring to Figure 10, the said means preferably includes a switch valve housing 100 within which a core 101 is rotatably disposed, said core being provided with an arm 103 which extends outwardly through a side wall of said housing. A switch-lever 102 is rigidly secured to the said arm 103.

The core is provided with bores 105 and 106 each having its ends spaced apart 45 degrees with respect to each other. When the ends of the bores 105 and 106 are moved by means of the lever 102 to the position shown in Figure 10, the outlet pipe 26 of the pump is placed in direct communication with the outlet pipe 95 of the motor. The pipe 95 then functions as an intake pipe for fluid under pressure for said motor for rotating the disc 86 in a direction opposite to that indicated by the arrow 97. At the same time the intake pipe 29 of the pump is placed in direct communication through the bore 106 with the intake pipe 93 of the motor so that the intake pipe 93 then functions as an outlet pipe for the motor 85 during the driving of the disc 86 in the direction reverse to that indicated by the arrow 97.

The core of the switch valve is also provided with a through straight bore 104, the ends of which are spaced apart 180 degrees. There is a further bore 107 which extends transversely through the core 101 of the switch valve 100, said bore 107 being disposed at a right angle to and to one side of the bore 104, as best shown in Figure 12. Also as shown in Figure 12 the ports of the switch valve housing 100 which are in communication with the inlet and outlet pipes are enlarged as at 108, whereby said enlargements 108 of said ports become aligned with the ends of the bore 107. It will be understood that the switch lever 102 may be moved from the position shown in Figure 10 to the position shown in Figure 11, whereby the bore 104 becomes aligned with the pipe 26 and the pipe 93 for a free passage of fluid under pressure through said pipes and said bore 104. This movement of lever 102 simultaneously brings the bore 107 into communication with the pipes 29 and 95 so that when the lever is in the position shown in Figure 11 fluid under pressure from the pump 19 circulates through the motor 85 for driving the disc 86 of the motor 85 in the direction indicated by the arrow 97.

It is thought that the operation of the device will be understood from the above description in connection with the drawings. When the stub axle 57 is rotated by engine 80 and assuming that said rotation is in an anti-clock-wise direction or in the direction of the arrow 77 shown in Figure 1, rotary motion is imparted thereby to the supporting housing 47 and to the parts of the device assembled in and attached to said housing. Also assuming that the throw pin 35 of the crank shaft 37 is in an initial substantially neutral position, as shown in full lines in Figure 4, a slight motion is imparted at this time to the connecting rods 32 by said crank throw whereby a very small amount of fluid under pressure is pumped by the pistons 30. At this time the sleeve 42 is positioned with respect to the spline portion 37' of the crank shaft 37 as shown in Figure 4.

It will be understood that if it is not desired that pressure be generated that the cut-off cock 28 be closed. It will be seen from Figure 1 that the crank throw pin 35 is slightly disposed to one side of a medial vertical line taken through the annular housing 20 as for instance along the dotted line 4—4 so that the crank throw pin 35 is eccentrically disposed with respect to the stub axle 57, which is aligned at all times with the exact center of the annular housing 20 whereby when the supporting housing 47 is rotated in said anti-clock-wise direction a very slight reciprocation is imparted to the piston heads 30 for starting a pumping operation.

Figure 5:
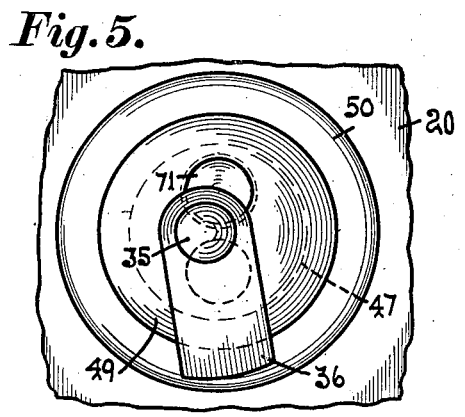
Figure 5 is an end view of the crank and showing the throw thereof in an approximate neutral or normal position.

For generating and utilizing fluid under pressure, the cut-off cock 28 is opened in accordance with the amount of pressure desired by the operator for a selected engine speed. The fluid under pressure is admitted through said cut-off cock and the conduit-bore 74 to the annular groove 75 and thence through the apertures 76 to the interior of the cylinder 70. The pressure is applied against the piston head 69 for causing the latter to overcome the urge of the spring 72 and moving said piston and its rod in the direction indicated by the arrow 73 for causing the push-pull-fork 63 to move the sleeve 42 in the direction of the arrow 73. When the sleeve 42 is moved in the direction of the arrow 73 the sliding motion of the sleeve 42 imparts a rotary motion in an anti-clock-wise direction to the crank shaft 37 through the inwardly disposed lugs 44 of the sleeve 42 and the complemental spiral splines 37' of the crank shaft 37. The rotary movement thus imparted to the crank shaft 37 causes a corresponding movement of the crank throw pin 35 in an anti-clock-wise direction for causing the throw to swing from the substantially neutral position shown in Figure 5, to the position shown in Figure 6 and to cause said stub axle pin 35 to describe a swing of substantially 180 degrees. The sleeve 42 must be fully extended in the direction of the arrow 73 for causing a full swing of 180 degrees.

Assuming that the operator desires less pressure for doing a certain type of work he sets the valve 28 accordingly whereby less pressure is applied to the piston head 69, whereupon the spring 72 causes the piston head to slide in a direction reverse to the arrow 73. The sleeve 42 will retire correspondingly into the housing 47 thereby causing the crank throw 35 to move towards said substantially neutral position. The stroke of the piston heads 30 are correspondingly lessened in length and less fluid is pumped under less pressure. It is thus apparent that the length of the stroke of the pistons 30 may be varied within the limits of the length of the sleeve 42.

With this structure means are provided for varying the length of the stroke of the pump pistons whereby fluid under a selected degree of pressure may be generated with regard to the speed at which the pistons are reciprocated or driven by an engine or other suitable source of power.

When traffic conditions so warrant the valve 28 is opened and when a desired pressure is built up and applied to the piston head 69 said valve may then be closed for trapping said pressure in the cylinder 70 for maintaining a selected length of stroke for the pump pistons until such time as the valve 28 is again opened for releasing said trapped pressure. It will be noted that at times when traffic conditions require numerous and frequent changes of speed that the valve 28 may be permitted to remain in an open position and that without any actuation of the valve 28 and while the driver engine is operating at a selected speed and the vehicle is traveling at a proportional speed, that during a decrease of engine speed for causing the vehicle to travel slower, the pressure provided by the pump decreases whereby the pressure applied to the piston 69 becomes less, permitting the spring 72 to urge the crank throw-pin 35 toward the axis of the housing 47, thereby permitting said pin to travel in a circular path of movement of lesser radius than before said decrease with an attendant shortening of stroke length of the pistons of the pump and during revoluble movement of the regulator device shown in Figure 4 resultant from the responsiveness of said device to oil under pressure. Also the valve 28 may remain open during an acceleration of engine speed and vehicle speed resultant from an increase of pressure caused by said increase of engine speed.

As thus described it will be noted that among other advantages of the regulator device when employed in an environment combination which includes a hydraulic turbine motor on the propeller shaft of a vehicle such as a motor-boat, automobile or the like, said combination provides a noiseless transmission of power at variable speeds.

It will be understood that certain features and sub-combinations are of utility and may be employed without reference to other features and sub-combinations. This is contemplated by and is within the scope of my claims. It is further obvious that various changes may be made in the details within the scope of my claims without departing from the spirit of my invention. It is therefore to be understood that my invention is not to be limited to the specific details shown and described.

What is claimed is:

1. A device for the purpose described comprising a bearing having an annular groove disposed upon the inner annular wall thereof, said groove being adapted to receive oil under pressure therein, a housing adapted to be connected to an engine for rotating said housing in said bearing, said housing having an annular wall portion disposed across said groove for confining said oil in said groove, a cylinder carried by said housing having an aperture adjacent one end thereof disposed in communication with said groove for admitting said oil under pressure to said cylinder during revoluble movements of said housing and cylinder, a piston-head in said cylinder provided with a piston-rod disposed through that end wall thereof which is opposite with respect to said aperture, a spring for urging said piston-head toward said aperture, said oil under pressure being adapted to slide said head and rod against the urge of said spring a distance commensurate with the degree of said pressure and the opposing urge of said spring, a fork secured to the piston-rod outwardly of said cylinder adapted to abut the latter for limiting sliding movements of the piston-head in one direction, said housing being provided with a bore disposed in approximate alignment with and at one side of the axis of said housing, a sleeve disposed in said bore having an end engaged with said fork for causing simultaneous longitudinal sliding movements of said sleeve and piston-rod, said sleeve being provided with a spiral groove upon the inner annular wall thereof, a rotatable crank-shaft disposed through said bore and sleeve, detent means carried by said housing for preventing longitudinal sliding movements of said crank-shaft, said crank-shaft having a spiral rib cooperatively disposed in said spiral groove of said sleeve for rotating said crank shaft during sliding movements of said sleeve and piston-rod, a crank-arm carried by said crank-shaft provided with a crank-throw pin, said crank-pin being swingable toward and away from the axis of said housing at times when said crank shaft is rotated upon the axis for providing said pin during a revolution of said housing, with a circular path of movement the radius of which is proportional to the degree of said pressure, said crank-pin being adapted to have a driving connection with an oil pumping mechanism for supplying a degree of oil under pressure to said cylinder proportional to the speed of said engine.

2. A device for actuating an oil pumping mechanism for providing a circulation of oil under pressure responsively with respect to a driver engine's speed comprising a bearing provided with a conduit adapted to be connected to a source of supply of oil under pressure, a housing adapted to have a driven connection with an engine for rotating said housing axially in and with respect to said bearing, a cylinder carried by and rotatable with said housing having an aperture in communication with said conduit for admitting oil under pressure to the interior of said cylinder, a piston-head in said cylinder adapted to have sliding movements between said aperture and an end wall of said cylinder and provided with a rod disposed through said end wall, a spring for urging said piston-head away from said end wall, a crank-shaft carried by said housing and rotatable simultaneously therewith, a crank-throw pin carried by said crank-shaft, said crank-shaft being adapted to be revolved in either a clockwise or an anti-clockwise direction for disposing said pin toward or away from the axis of said housing, a spiral rib provided on said crank-shaft, a connector secured to said piston-rod and engaged with said rib for revolving said crank-shaft during sliding movements of said piston-rod and rotation of said housing for providing said crank-pin with a circular path of movement the radius of which is commensurate with the degree of pressure applied to said piston-head by said oil under pressure and the opposing urge of said spring, said crank-pin being adapted to have a driving connection with said oil pumping mechanism for providing said source of oil under pressure.

3. A regulator for limiting pressure variations in the flow of fluid to a hydraulic turbine correspondingly with respect to changes in the speed of operation as selected for a driver engine and comprising a housing, an oil under pressure operated piston carried by said housing, a crank shaft carried by said housing and rotatable by the operation of said piston, a crank-throw pin carried by said shaft and swingable to different positions at times when said shaft is rotated for providing said pin with circular paths of movement of different radius during a rotation of said housing, the latter being adapted to have a driven connection with said engine for rotating said housing, said pin being adapted to have a driving connection with a pump for applying pressure to said oil, and resilient means for urging said pin toward a normal position and path of lesser radius during a decrease in the operating speed of said engine and in the degree of said pressure.

4. A regulator for limiting pressure variations in the flow of fluid to a hydraulic pressure distributor correspondingly with respect to changes in the speed of operation as selected for a driver instrumentality comprising a housing, an oil under pressure operated piston carried by said housing, a crank-shaft provided with a helically disposed spline thereon, said crank-shaft being carried by said housing and rotatable by an operation of said piston, a crank-throw pin carried by said shaft and swingable to different positions at times when said shaft is rotated for providing said pin with circular paths of movement of different radius during a rotation of said housing, the latter being adapted to have a driven connection with said instrumentality for rotating said housing, said pin being adapted to have a driving connection with a pump for applying pressure to said oil, and means including a spring for urging said pin toward a normal position and path of lesser radius during a decrease in the operating speed of said instrumentality and in the degree of said pressure.

5. A device for the purpose described comprising a housing adapted to be rotated by a power actuated driver instrumentality, a cylinder and a crank-shaft carried by said housing and rotatable therewith, a fluid under pressure operated piston within said cylinder, a conduit for admitting fluid under pressure into said cylinder for causing said piston to slide, an operative connection between said crank-shaft and piston for causing said crank-shaft to be rotated during a sliding movement of said piston, a crank-throw pin carried by said shaft adapted to be swung to different positions responsive to a rotation of said shaft with respect to said housing for providing said pin with circular paths of movement of different radius during a rotation of said housing, said pin being adapted to have a driving connection with a pressure generator pump for said fluid for applying fluid under pressure to said piston, resilient means for urging said pin toward a path of lesser radius during a decrease of said power and a corresponding decrease in the degree of pressure applied to said piston, and a cut-off valve manually operable at desired times for closing said conduit for causing said piston to remain in a selected position with respect to said cylinder for driving said pump correspondingly.

JOSEPH A. PETERSON.